United States Patent [19]

Healy et al.

[11] 3,994,342
[45] Nov. 30, 1976

[54] MICROEMULSION FLOODING PROCESS

[75] Inventors: Robert N. Healy; Walter W. Gale, both of Houston, Tex.

[73] Assignee: Exxon Production Research Company, Houston, Tex.

[22] Filed: July 3, 1975

[21] Appl. No.: 592,980

Related U.S. Application Data

[63] Continuation-in-part of Ser. No. 430,331, Jan. 2, 1974, abandoned.

[52] U.S. Cl. ............................. 166/273; 166/275
[51] Int. Cl.² .................... E21B 43/20; E21B 43/22
[58] Field of Search ........ 166/273, 274, 275, 305 R, 166/306

[56] References Cited
UNITED STATES PATENTS

| | | | |
|---|---|---|---|
| 2,356,205 | 8/1944 | Blair et al. ...................... | 166/305 R |
| 3,497,007 | 2/1970 | Williams et al. .................... | 166/273 |
| 3,734,185 | 5/1973 | Jones .................................. | 166/273 |
| 3,799,263 | 3/1974 | Prillieux et al...................... | 166/275 |
| 3,811,504 | 5/1974 | Floornoy et al. ................... | 166/274 |

*Primary Examiner*—Stephen J. Novosad
*Assistant Examiner*—George A. Suchfield
*Attorney, Agent, or Firm*—Gary D. Lawson

[57] ABSTRACT

Crude oil remaining in a subterranean formation is recovered through the injection of a microemulsion comprising an oil, i.e. a refined or crude oil, an aqueous medium and as a surfactant, a $C_{8-16}$ orthoxylene sulfonate. The aqueous medium is preferably a brine having a salt concentration of up to about 2 1/2% by weight, although increased brine tolerance can be achieved by inclusion of a cosurfactant within the microemulsion. When utilized in the secondary or tertiary recovery of crude oil, the microemulsion is preferably followed by thickened water and thereafter unthickened water injected into and through the subterranean formation.

30 Claims, 8 Drawing Figures

MICROEMULSION FLOODING PROCESS

CROSS-REFERENCE TO RELATED APPLICATION

This application is a continuation-in-part of U.S. Patent Application Ser. No. 430,331, filed Jan. 2, 1974, now abandoned.

BACKGROUND OF THE INVENTION

1. Field of the Invention

This invention relates to a novel microemulsion utilizing as the surfactant a $C_{8-16}$ orthoxylene sulfonate and a method of recovering crude oil from subterranean formations utilizing such microemulsion. More specifically, the present invention preferably relates to such microemulsion and method of recovering crude oil therewith in a secondary or tertiary recovery method wherein the microemulsion is injected into a subterranean formation so as to displace the crude oil therein.

2. Description of the Prior Art

The crude oil which is accumulated in subterranean formations is recovered or produced therefrom through one or more wells drilled into the subterranean formation with the initial production of the crude oil being carried out by what is referred to as "primary recovery," i.e. where only initial formation energy is used to recover the crude oil. The primary recovery technique, however, leaves substantial quantities of crude oil in the subterranean formation. Accordingly, the recognition of the large amount of crude oil in many oil-producing subterranean formations and reservoirs has led to the use of so-called "secondary and tertiary recovery" techniques which have as their primary purpose the economical recovery of additional quantities of oil known to be present in the subterranean formation or reservoir after primary depletion.

Probably one of the most common secondary recovery techniques is the so-called "waterflooding" in which aqueous fluids are injected at one or more points in the reservoir at pressures sufficient to be forced out into the reservoir and toward a spaced production well or wells so as to effect a displacement of the oil from the pores of the reservoir and a driving of the oil ahead of the water front to the production well or wells.

As can be easily understood the waterflooding technique and similar secondary recovery techniques are only advantageous when the cost of the water and any additional necessary chemical modifiers is less than the value of the oil which is recovered after primary depletion. Accordingly, the displacement efficiency of the waterflood and similar techniques has been a determining factor in connection with whether such technique can be satisfactorily utilized in oil recovery.

The displacement efficiency of the water itself is relatively poor primarily due to the formation of discontinuous oil droplets from the continuous oil as the waterflood proceeds. Furthermore, there is a relatively high interfacial tension between the water and the oil which contributes to the capillary retention of the discontinuous oil and thereby prevents its displacement by water under pressure gradients feasible in reservoir flooding processes. The displacement efficiency decreases with increasing interfacial tension thereby making recovery of oil quite difficult.

As a result of the foregoing, various aqueous surfactant systems have been proposed for use in waterflooding processes for recovering oil. Thus it has been proposed that the interfacial tension between the oil and water can be reduced from a characteristic value of the order of 35 dyne per centimeter to a value of less than 1 dyne per centimeter with the proper selection of a surfactant or surfactants. Here again, however, the selection of a particular surfactant depends not only upon the ability of the surfactant to reduce the interfacial tension between the oil and water but in addition the cost of the surfactant, since again in any secondary or tertiary recovery technique the cost of the materials utilized must be significantly less than the value of the oil which can be recovered.

Not only have surfactants been proposed for utilization in secondary recovery techniques such as waterflooding but in addition aqueous surfactant solutions have been proposed for tertiary recovery techniques to recover residual oil from a "watered-out" reservoir. In such uses a slug of an aqueous surfactant system will be introduced into the watered-out reservoir followed by a driving fluid to drive the slug of aqueous surfactant through the reservoir so as to allow displacement of the residual oil trapped in the pores of the reservoir.

More recently, secondary and tertiary recovery techniques have turned toward the applicability of microemulsions, the microemulsions comprising an oil, i.e. a refined or crude oil, an aqeous medium, sufficient surfactant to form the microemulsion, and optionally an electrolyte and cosurfactant. Such microemulsions have advantages when compared with aqueous surfactant solutions in that in the microemulsion there is a lessened tendency for the surfactant to be retained by the formulation rock, thereby allowing a more efficient utilization of the surfactant for displacement of the crude oil in the secondary and tertiary recovery techniques and an associated increase in oil recovery. Furthermore, microemulsions show good injectivity and almost complete recovery of the crude oil while intact.

While various types of microemulsions have been developed for secondary and tertiary recovery techniques, the microemulsions themselves have certain disadvantages including problems of stability and salt tolerance, with the surfactants developed to date being those which are generally useful under conditions of low salinity only. Noting these problems, the art has long sought a microemulsion system which is stable and can effectively and economically provide for the displacement and recovery of crude oil in secondary and tertiary recovery techniques eliminating the deficiencies associated with aqueous surfactant solutions and previously developed microemulsions.

SUMMARY OF THE INVENTION

It has now been discovered in accordance with the present invention that an effective microemulsion for the recovery of crude oil from a subterranean formation can be provided through the utilization of a surfactant which is an alkyl orthoxylene sulfonate, i.e. a basic salt of a $C_{8-16}$ orthoxylene sulfonic acid. It has been discovered in accordance with the present invention that such surfactant can advantageously produce microemulsions which are effective for the recovery of crude oil from a subterranean formation, particularly at low salinities, i.e. salt concentrations of up to about 2½ percent by weight. Still further, it has been discovered in accordance with the present invention that increased brine tolerance can be provided by introduction of one or more cosurfactants into the microemulsion. The present invention finds application in both secondary and tertiary recovery techniques with the microemulsion being usefully employed in accordance with the present invention to recover the crude oil remaining in a subterranean formation subsequent to primary depletion or secondary depletion wherein the microemulsion is injected into the subterranean formation as a slug with subsequent injection of thickened water followed by unthickened water. In this way, the microemulsion slug is driven through the subterranean formation displacing the crude oil therein and allowing the production of the crude oil through one or more production wells.

Accordingly, it is a principal object of the present invention to provide a single-phase microemulsion adapted for use in a microemulsion flooding process for the recovery of crude oil, wherein such microemulsion eliminates the disadvantages associated with previously proposed materials and allows for the effective and economical recovery of the crude oil.

It is a further object of the present invention to provide such single-phase microemulsion wherein the microemulsion comprises an oil, an aqueous medium and, as the surfactant, a $C_{8-16}$ orthoxylene sulfonate.

It is a further object of the present invention to provide a novel microemulsion wherein the microemulsion exhibits an interfacial tension of from 0.0 to 0.1 dyne/cm with the crude oil.

It is still further object of the present invention to provide such microemulsion specifically adapted for the secondary or tertiary recovery of residual oil from a primary depleted or watered-out reservoir wherein the microemulsion includes as the effective surfactant, a $C_{8-16}$ orthoxylene sulfonate, preferably a $C_{12}$ orthoxylene sulfonate.

It is yet a further object of the present invention to provide such microemulsion specifically adapted for the secondary or tertiary recovery of oil from a primary depleted or watered-out reservoir wherein the microemulsion has increased brine tolerance associated with the additional presence of one or more cosurfactants.

It is still a further object of the present invention to provide an improved method for recovery of crude oil from a subterranean formation wherein a microemulsion is injected into the formation through at least one injection means to displace crude oil in the formation toward at least one production means, the improvement residing in the use of a microemulsion which comprises an oil, i.e. crude oil or refined oil, an aqueous medium and an effective amount of a surfactant comprising a $C_{8-16}$ orthoxylene sulfonate, preferably a $C_{12}$ orthoxylene sulfonate.

A still further object of the present invention involves such method for the recovery of crude oil from a subterranean formation wherein a microemulsion is injected subsequent to primary depletion and waterflooding, the microemulsion being based upon the use of a $C_{8-16}$ orthoxylene sulfonate, preferably a $C_{12}$ orthoxylene sulfonate, as the surfactant, the injection of the microemulsion being followed by the injection of thickened water and subsequently unthickened water.

Still further objects and advantages of the present invention will become more apparent from the following more detailed description thereof.

DESCRIPTION OF THE PREFERRED EMBODIMENT

Figure 1:
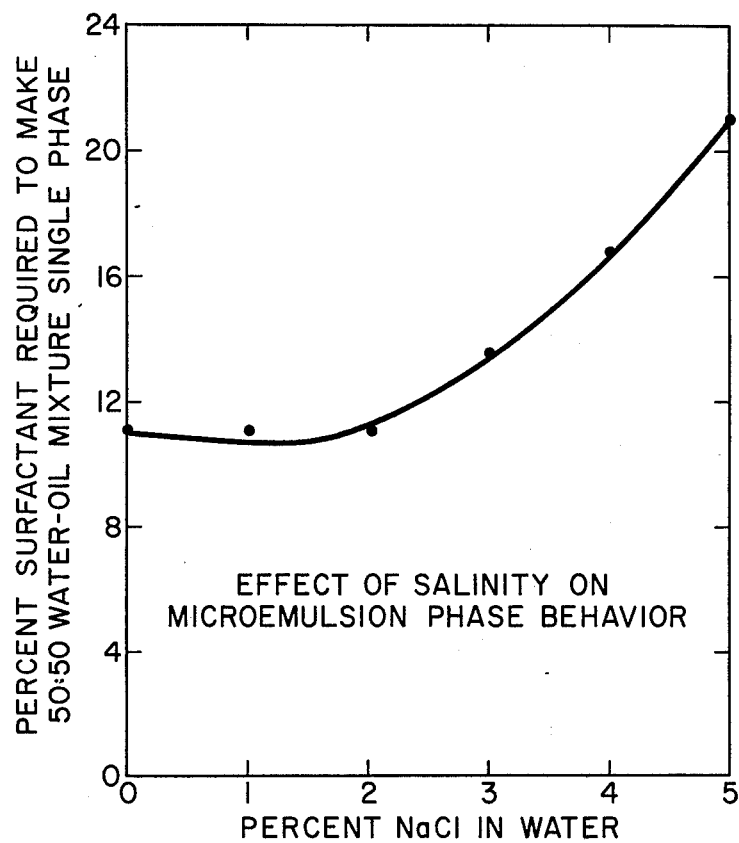
FIG. 1 is a plot of the percentage of surfactant required to make a 50:50 water-oil mixture single phase versus the percentage sodium chloride in water in the microemulsion illustrating the effect of salinity on the microemulsion phase behavior.

The expression "microemulsion" as employed throughout can be defined as a stable transparent or translucent micellar solution of oil, water, which may optionally contain one or more electrolytes, and one or more amphiphilic compounds, i.e. a surfactant and optionally a cosurfactant. Accordingly, the microemulsions to which the present invention pertain include as essential components an oil, water and a surfactant, i.e. an alkyl orthoxylene sulfonate, with the optional presence of one or more electrolytes and one or more cosurfactants. As will be discussed hereinafter, the microemulsions employed in accordance with the present invention may be water-external microemulsions or oil-external microemulsions. Simlarly, the microemulsions of the present invention can conveniently fall into that class of micellar structures in which there is no identifiable external phase.

In the preferred practice of this invention, one or more oils, aqueous medium, and surfactant, with optional thickener, electrolytes, and cosurfactants, are mixed in such proportions that a composition falling within the single-phase region of an oil-water-surfactant ternary diagram is formed. When a single-phase microemulsion is injected into a formation, the effects of dilution will nearly always cause the microemulsion composition to pass into the multiphase region where the microemulsion will separate into two or more immiscible phases. Therefore, as discussed previously, the criteria with respect to the applicability of microemulsions for efficient crude oil recovery lie in minimizing the size of the multiphase region and lowering the interfacial tension between phases formed from compositions within the multiphase region of the ternary diagram.

The importance of minimizing the interfacial tension between immiscible phases in a microemulsion system may be best illustrated by reference to FIG. 7. This FIGURE is a graph of the results of core displacement tests showing the percent of residual oil recovery as a function of interfacial tension between the injected microemulsion and the residual oil phase.

The cores used in these displacement tests were sections of Berea sandstone having cross sections of 1 by 1 inch and length of 12 inches. The cores had permeabilities of approximately 350 millidarcies and were mounted in epoxy with tap-fittings at each end for injection and production of fluids.

Prior to conducting the displacement tests, the cores were flooded with oil and brine to approximate the oil and water saturations that would exist in an oil reservoir which had been flooded to the point that no further oil could be produced. In these flooding operations, the cores were first saturated with a brine solution. The cores were then flooded with Isopar-M/Heavy Aromatic Naphtha (HAN) is a ratio of 9/1 until no further brine could be produced. Isopar-M and Heavy Aromatic Naptha are tradenames for refined paraffinic and aromatic oils, respectively, sold by Exxon Company, U.S.A. The 9/1 ratio of the two oils was chosen to simulate crude oil. The cores were then once again flooded with brine to remove all the oil which could be recovered by this conventional waterflooding process. At this point the quantites of oil and waer remaining in the cores approximated those of a reservoir which had been waterflooded to residual oil saturation. The residual oil in each of these cores was approximately 30% of the pore volume of the core; the remaining 70% was saturated with standard brine.

After the cores had been waterflooded to residual oil saturation a series of displacement tests were conducted on the cores by injecting microemulsions into the cores. The microemulsions were composed of an aqueous solution containing 1% sodium chloride, a 90/10 mixture of Isopar-M/HAN, and a surfactant. The surfactant solution used to form the microemulsion contained 63% by volume dodecyl orthoxylene sulfonate and 37% tertiary amyl alcohol. The microemulsions injected into the Berea cores were immiscible with the residual oil (Isopar-M/HAN). Interfacial tension measurements were made between the microemulsion injected into each core and the residual oil phase in the Berea core. Floods were conducted at an average frontal velocity of approximately 1 foot per day.

Figure 7:
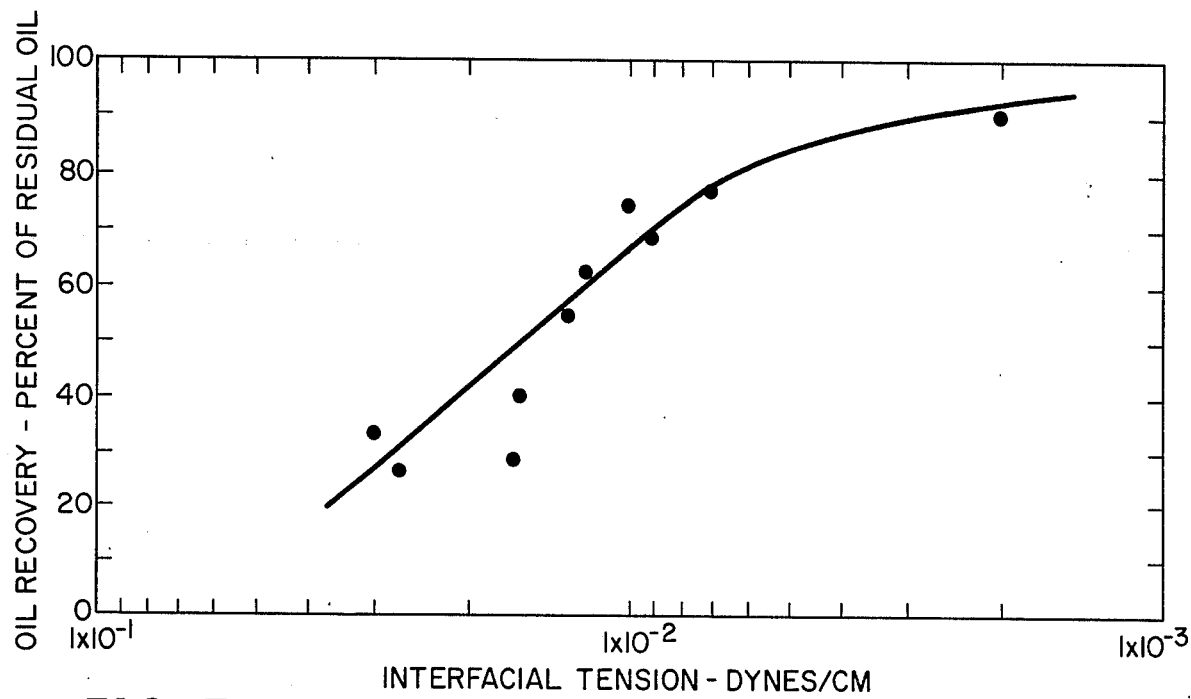
FIG. 7 shows the results of core displacement tests using microemulsions. This FIGURE gives oil recovery as a function of the interfacial tension between the microemulsion injected into the cores and the residual oil phase in the cores. Oil recovery is expressed as a percent of residual oil recovered after a microemulsion flood. The interfacial tension is given in dyne/cm and is plotted on a log scale.

As can be seen from FIG. 7, for effective oil recovery in a typical oil recovery process, the interfacial tension between a microemulsion and the oil phase immiscible with said microemulsions should be less than 0.1 dyne/cm, and preferably less than 0.01 dyne/cm.

The microemulsions of the present invention satisfies the foregoing criterion for an effective microemulsion for oil recovery by providing a stable, single-phase microemulsion with the interfacial tension between the microemulsion and the oil used to form said microemulsion being less than 0.1 dyne/cm. This interfacial tension may range from 0.0 to 0.1 dynes/cm and preferably ranges from 0.0 to 0.04 dynes/cm. Of course, the microemulsion is miscible with crude oil when there is no interfacial tension, i.e. the interfacial tension is 0.0 dynes/cm.

The oil which is employed in the microemulsion of the present invention can be any refined or crude oil. Typical examples include both sweet and sour crude oils and refined fractions such as side cuts from crude columns, crude column overheads, gas oil, kerosenes, heavy naphthas, naphthas, straight run gasolines, etc. It is preferred that the oil which is employed be one which has physical and chemical characteristics approximating the characteristics of the crude oil of the subterranean formation. The selection of any particular oil, be it a refined oil or crude oil, can be easily carried out based upon simple considerations including the chemical and physical characteristics of the crude oil in the subterranean formation. Accordingly, the use of any and all conventionally employed refined and crude oils in applicable to the composition and method of the present invention.

The aqueous medium employed in the formation of the microemulsion of the present invention can be pure water, but is most preferably a brine having a low salt concentration. The optimum salinity range for any particular microemulsion system is dependent upon the salt tolerance of the surfactant. This can be seen from a review of FIG. 1 which plots the percentage of a typical surfactant within the scope of the present invention, i.e. monoethanolamine $C_{12}$-orthoxylene sulfonate required to make a 50:50 water-oil mixture single-phase versus the percentage of sodium chloride in the water. It can be seen from FIG. 1 that the range of optimum salinity for the oil-water-monoethanolamine $C_{12}$-orthoxylene sulfonate system is from 0 to 2% NaCl. Accordingly, when considering a microemulsion comprising oil, water and this surfactant, it is preferred that the water medium contain up to 2% NaCl. Of course, the optimum salinity range for any particular microemulsion system will depend, among other criteria, on the particular surfactant employed.

In a preferred embodiment of the present invention the aqueous medium which is employed should have physical and chemical characteristics, specifically salinity, approximating the characteristics of the connate water of the subterranean formation. Accordingly, when a higher salinity is required, increased brine tolerance can be imparted to the microemulsion by addition of one or more cosurfactants. This feature of the present invention will be discussed hereinafter.

The third essential component of the microemulsion of the present invention is the surfactant, i.e. $C_{8-16}$ orthoxylene sulfonate. While the alkyl group of the orthoxylene sulfonate will generally predominate in one alkyl group, generally the alkyl group has a molecular weight distribution which encompasses a portion of or the entire range set forth above with possibly minor amounts of alkyl groups of even shorter or longer chain lengths.

The preferred alkyl chain is a $C_{12}$ or dodecyl chain with a typical molecular weight distribution of an alkyl chain predominating in $C_{12}$ being as follows:

| Carbon Atoms in Side Chain | Molecular Weight Distribution |
| --- | --- |
| $C_{10}$ | 10.6 |
| $C_{11}$ | 16.1 |
| $C_{12}$ | 57.2 |
| $C_{13}$ | 9.6 |
| $C_{14}$ | 3.8 |
| $C_{15}$ | 2.7 |

Accordingly, as used throughout, the term "$C_{12}$ orthoxylene sulfonate" identifies an orthoxylene sulfonate having a side chain which is 12 carbon atoms in length or in which a 12 carbon atom side chain predominates in the molecular weight distribution of the alkyl side chain. As used herein, "predominates" shall mean that the recited side chain is present to an extent greater than any other single side chain.

In addition to the alkyl group of 8 to 16 carbon atoms and in addition to the sulfonate group, the orthoxylene sulfonate can optimally contain one or more groups, including additional alkyl chains which do not interfere with the basic surfactant structure and the ability of the $C_{8-16}$ orthoxylene sulfonate to perform effectively in the practice of the present invention. Accordingly, the description of the $C_{8-16}$ orthoxylene sulfonate throughout is meant to embrace the optional presence of such additional groups.

The $C_{8-16}$ orthoxylene sulfonate employed in the microemulsion of the present invention is employed in the form of salt of the sulfonic acid. The salt-forming cation can be selected from those conventionally utilized; exemplary cations being basic metals such as sodium and other alkali and alkaline earth metals, ammonium and amines. Of these, the amine salts, and particularly $C_{1-4}$ mono-, di- and tri-alkanolamine salts are preferred. The monoethanolamine salt of the $C_{8-16}$ orthoxylene sulfonic acid is a preferred surfactant for use in the microemulsion of the present invention.

The surfactants can be prepared by techniques well-known in the art, including conventional techniques of alkylation, sulfonation, and finally salt formation by reacting the sulfonic acid with a suitable base. Accordingly, the preparation of the surfactants employed in accordance with the present invention will not be exemplified further since the techniques for such production as well as the materials themselves are well-known.

In preparing the microemulsion of the present invention, the proportions of oil, water, and surfactant are not particularly critical as long as the same are sufficient to provide the desired single-phase microemulsion. Accordingly, the amount of water and amount of oil can vary within wide limits, it being noted again that it has been discovered in accordance with the present invention that the method of the present invention is applicable to both the employment of water-external microemulsions and oil-external microemulsions as well as those micellar structures in which no particular external phase is discernible. This discovery is based upon the fact that the ability of the microemulsion to effectively displace crude oil in a microemulsion flooding process is not dependent upon the form of the external phase but rather is based primarily upon a minimization of the multiphase region in a ternary diagram of oil, water, and surfactant so as to prolong miscible displacement and low interfacial tensions in the mutilphase region so as to enhance immiscible displacement. Accordingly, to formulate the desired microemulsion and to provide an efficient and effective microemulsion process to recover crude oil from a subterranean formation, it is merely necessary that the surfactant be employed in an amount effective to produce the desired microemulsion. For most purposes, the $C_{8-16}$ orthoxylene sulfonate is employed in an amount of from about 0.1 to about 15 percent based upon the volume of the microemulsion, the upper limit being based upon economic considerations.

As indicated previously, increased brine tolerance can generally be imparted to the microemulsion system by the further inclusion of one or more cosurfactants, the cosurfactant or cosurfactants being employed in an amount effective to increase the brine tolerance and to adjust the viscosity of the microemulsion. Generally, the cosurfactant is employed in an amount of from about 0.01 to about 20% based upon the volume of the microemulsion. Any surface-active material having a lipophilic portion and a polar portion can be effectively utilized as a cosurfactant in the practice of the present invention. The cosurfactants found to be particularly effective in increasing brine tolerance are those cosurfactants including but not being limited to alcohols, ethoxylated alcohols, sulfated ethoxylated alcohols, sulfonated ethoxylated alcohols, ethoxylated phenols, sulfated ethoxylated phenols, sulfonated ethoxylated phenols, and synthetic sulfonates. The alcohols which are used as cosurfactants are generally $C_{3-20}$ alcohols including, for example, isopropanol, isobutanol, t-butanol, the amyl alcohols such as n-amyl alcohol, t-amyl alcohol, 1- and 2-hexanols, 1- and 2-octanols, decyl alcohol, etc. Also included within the scope of applicable alcohols are alkylaryl alcohols such as p-nonyl phenol and alcoholic liquors such as fusel oil. Of such alcohols, particularly useful alcohols are the lower alcohols such as butanols, amyl alcohols, hexanols, etc. A particularly preferred alcohol is tertiary amyl alcohol. The ethoxylated alcohols which are applicably employed as the cosurfactant in the microemulsion and method of the present invention are generally ethylene oxide adducts of $C_6$ to $C_{20}$ primary alcohols wherein the adduct contains from 1 to about 100 moles of ethylene oxide. Such ethoxylated alcohols are available commercially from Shell Chemical Company under the tradename "Neodol" or from Conoco under the name "Alfol" and others. For example, the Neodol identified as Neodol 23-6.5 is a mixture of $C_{12}$–$C_{13}$ alcohols having an average of 6.5 ethylene oxide groups. Conoco "Alfol" alcohols such as Alphonic 1012-6 or 1218-6 have the following structural formulas: $C_3 - (CH_2)_x - O - (OCH_2CH_2)_n - H$ wherein $x$ is an integer of from 8 to 16 and $n$ is an integer of 5 to 8. Alphonic 1012-6 is a $C_{10}$–$C_{12}$ primary alcohol containing six ethylene oxide units and Alphonic 1218-6 is a $C_{12}$–$C_{18}$ primary alcohol containing six ethylene oxide units. These ethylene oxide adducts of primary alcohols as well as related materials can be conveniently employed as the cosurfactant in the microemulsion and method of the present invention.

The sulfated ethoxylated alcohol cosurfactant can be prepared by suitable means such as sulfating with chlorosulfonic acid, sulfur trioxide, sulfonic acid, oleum or sulfuric acid in a suitable solvent, a surface-active water-soluble ethoxylated alcohol having from about 10 to about 20 carbon atoms. Preferred materials comprise ethoxylated alcohols represented by the general formula: $RO - (C_2H_4O)_{2-10} - H$ wherein R is an alkyl radical of 10 to 20, preferably 12-15 carbon atoms.

Sulfates of ethoxylated primary alcohols are commercially available from Shell Chemical Company under the tradename Neodol 23-3A having the formula $C_{12-13}O(CH_2CH_2O)_3SO_3NH_4$ and Neodol 25-3S of the formula $C_{12-15}O(CH_2CH_2O)_3SO_3Na$.

Other anionic sulfated ethoxylated alcohols are available from Union Carbide under the tradename Tergitol S such as Tergitol Anionic 14-S-3A (ammonium salt) or 15-2-3.0 (sodium salt).

The ethoxylated phenols which can be effectively employed as the cosurfactant in accordance with the microemulsion and method of the present invention comprise ethylene oxide adducts of alkylated phenols such as octyl phenols, nonyl phenols, etc. The number of ethylene oxide groups varies from 1 to about 100 with up to 10 ethylene oxide groups being preferred. These adducts of ethylene oxide and alkyl phenols can be prepared by techniques which are well-known and the adducts are commercially available materials.

For example, ethylene oxide adducts of nonyl phenols having varying numbers of ethylene oxide units are available commercially under the "Triton-N" Series from the Rohm & Haas Company, Philadelphia, Pa., and also under the name "Igepal" available from GAF Corporation, Dyestuff and Chemical Division, and also from Antara Chemicals. Also, ethylene oxide adducts of octyl phenols are available commercially under the "Triton X" series of Rohm & Haas.

The sulfated ethoxylated phenols can be prepared by techniques well-known in the art, the techniques being similar to the sulfation technique described previously with regard to the sulfated ethoxylated alcohols. Accordingly, any of the above noted ethoxylated phenols can be sulfated with the sulfated ethoxylated phenols being applicably employed as a cosurfactant in the microemulsion and method of the present invention.

The sulfonated ethoxylated phenols applicable in accordance with the present invention can be represented by the formula:

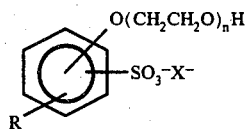

wherein R is an alkyl group having from six to eighteen carbon atoms, $n$ is an integer of 1–100 and X is a suitable cation. These materials can be prepared by alkylation of phenol, sulfonation of the alkylated phenol and subsequent ethoxylation. Similarly the sulfonated ethoxylated alcohols can be conveniently prepared by sulfonating any of the ethoxylated alcohols previously discussed.

The synthetic sulfonates which are applicable as the cosurfactant in accordance with the present invention are synthetic anionic surfactants differing in structure from the $C_{8-16}$ orthoxylene sulfonate employed as the surfactant in accordance with the present invention. The synthetic sulfonate can include a group of materials having a structural formula:

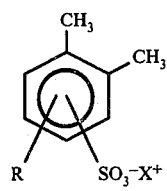

where X is a suitable cation and R is an alkyl group containing from one to seven carbon atoms.

It should be readily apparent from the above that the discussed cosurfactants are merely exemplary of the variety of cosurfactants which can be employed to increase the brine tolerance and adjust the viscosity of the microemulsion. Accordingly, any of the conventionally employed cosurfactants capable of increasing the brine tolerance and adjusting the viscosity of the microemulsion can be effectively utilized either singly or in combination of two or more in the microemulsion of the present invention and the present invention is not to be deemed as limited to those exemplified above.

Figure 2:
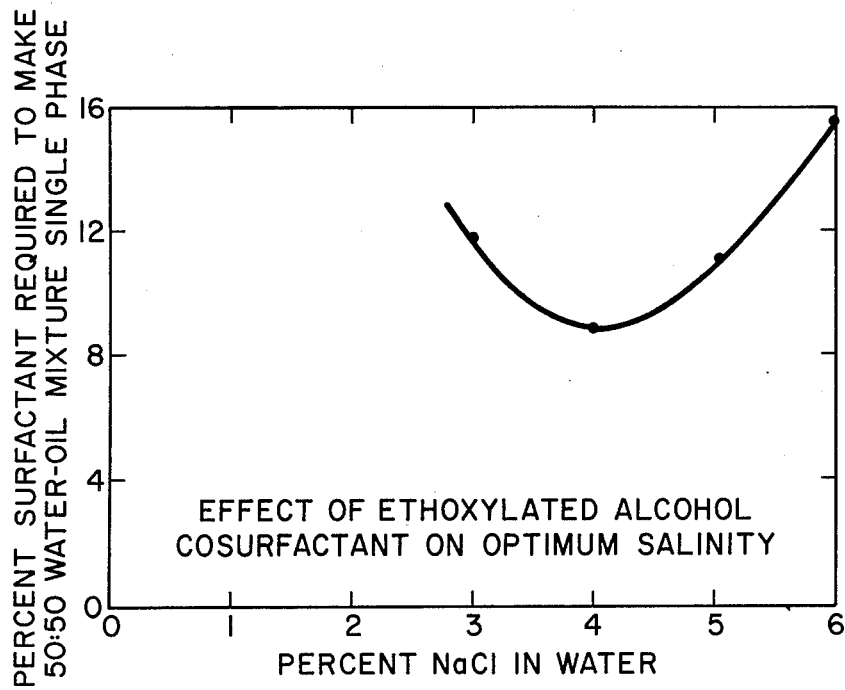
FIG. 2 is a plot of the percentage of surfactant required to make a 50:50 water-oil mixture single phase versus the percentage sodium chloride in water in the microemulsion illustrating the effect of a cosurfactant on optimum salinity, where optimum salinity is that salinity at which the graph exhibits a minimum.

The effect of the employment of a cosurfactant on brine tolerance and optimum salinity can be seen by reference to FIG. 2 which is a plot of the percentage of surfactant required to make a 50:50 water - oil mixture single-phase versus the percentage NaCl in water employing a cosurfactant, i.e. an ethoxylated $C_{12}$ alcohol (50 moles of ethylene oxide) in combination with the monoethanolamine $C_{12}$-orthoxylene sulfonate, the surfactant mixture containing 86% of the monoethanolamine $C_{12}$-orthoxylene sulfonate and 14% of the cosurfactant. It can be seen by comparing FIG. 1 to FIG. 2 that the optimum salinity of the system is increased to 4% NaCl by utilizing the ethoxylated alcohol cosurfactant together with the surfactant of the present invention. This, therefore, establishes that the microemulsion system containing a cosurfactant can be employed in most environments wherein high salt concentrations are present.

Figure 3:
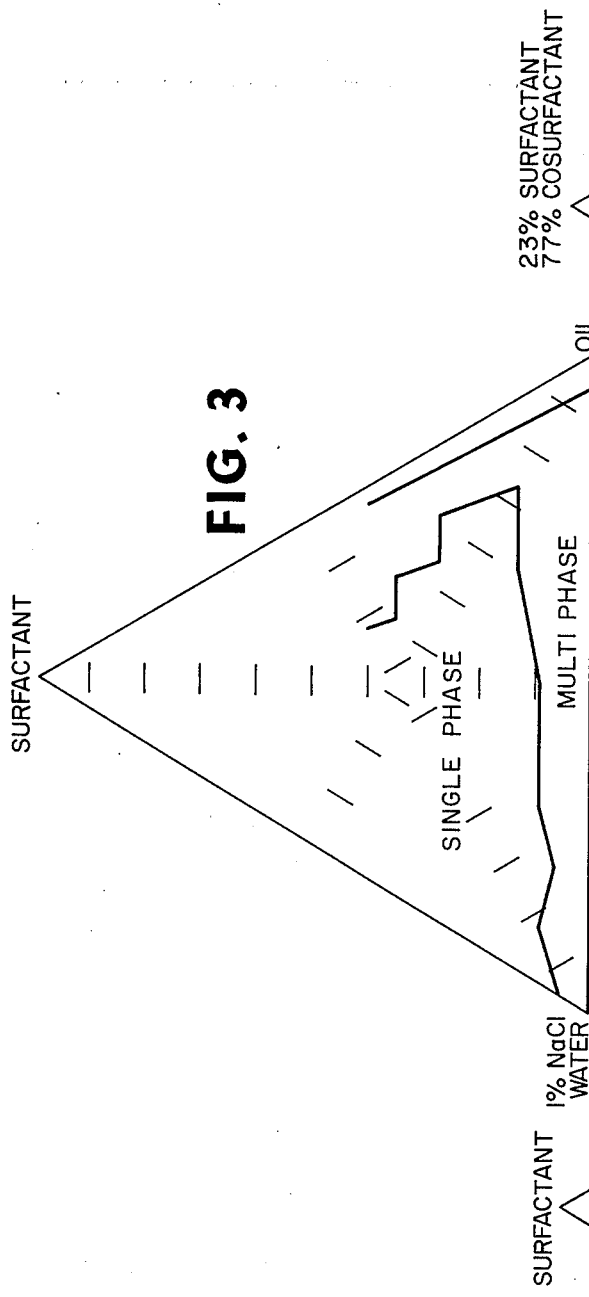
FIG. 3 is a ternary diagram for a monoethanolamine $C_{12}$-orthoxylene sulfonate microemulsion system developed with one percent NaCl water.
Figure 4:
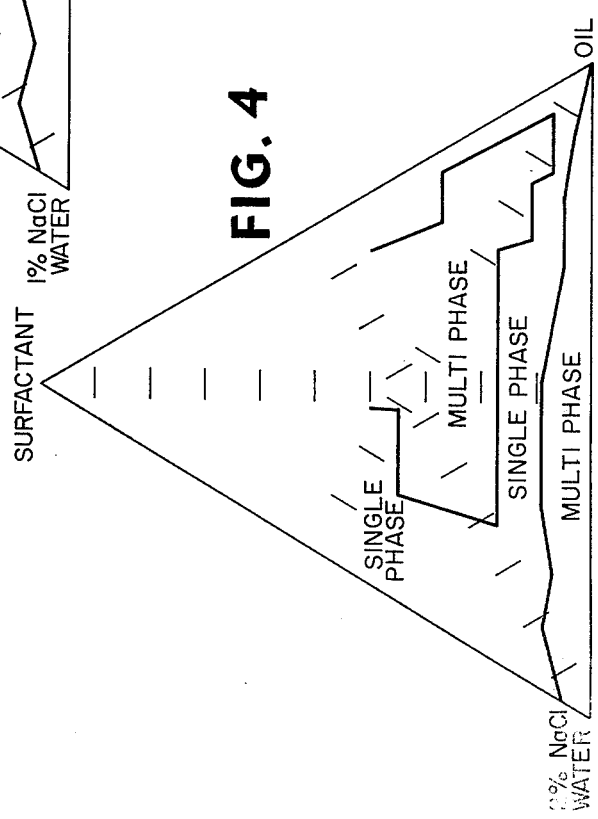
FIG. 4 is a ternary diagram for a monoethanolamine $C_{12}$-orthoxylene sulfonate microemulsion developed with two percent NaCl water.

FIGS. 3 and 4 represent ternary diagrams for the monoethanolamine $C_{12}$-orthoxylene sulfonate microemulsion systems for 1% sodium chloride in water and 2% sodium chloride in water respectively, the oil being a 90/10 Isopar M/Heavy Aromatic Naphtha mixture. Isopar M and Heavy Aromatic Naphtha are respectively tradenames for refined paraffin and aromatic oils sold by Exxon Company, U.S.A. The multiphase region and single-phase region for each of the systems is illustrated. The effect of salinity can be clearly seen from the size and location of the multiphase regions of the two systems.

Figure 5:
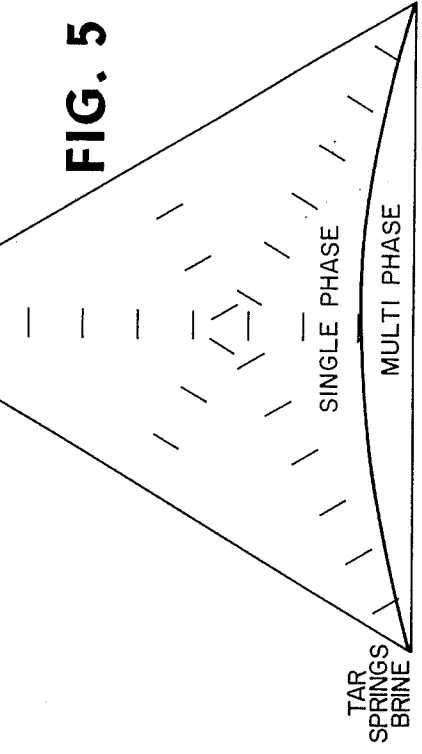
FIG. 5 is a ternary diagram for a monoethanolamine $C_{12}$-orthoxylene sulfonate-cosurfactant microemulsion system showing increased brine tolerance in a high salinity water.

FIG. 5 is a further ternary diagram illustrating the favorable phase behavior which can be achieved in Tar Springs Brine (a high salinity formation water — 35,800 ppm sodium, 2720 ppm calcium, 1140 ppm magnesium, 63,200 ppm chloride) by employing as a cosurfactant a sulfated ethoxylated phenol, i.e.

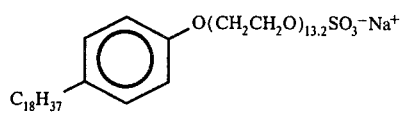

It can be seen from FIG. 5 that with the additional utilization of the cosurfactant the multiphase area is very small even with highly saline water. The stability of the microemulsion and the increased brine tolerance is therefore shown for this system which employs a cosurfactant.

In addition to the above, the microemulsion of the present invention can optionally include a thickener or mobility control agent. Typical thickeners include water-soluble polymers including polysaccharides, such as "Kelzan XC" sold by Kelco Corporation, and high molecular weight polyacrylamides, more specifically partially hydrolyzed polyacrylamides, such as "Pusher" sold by Dow Chemical Company. The thickener is employed in the microemulsion in an amount sufficient to create a favorable mobility ratio between the microemulsion and the fluids being displaced by the microemulsion.

As indicated previously, the microemulsion of the present invention is utilized in a microemulsion flooding process, preferably a microemulsion flooding process wherein the microemulsion is injected into the subterranean formation in the form of a slug followed by the injection of thickened water and thereafter unthickened water either for the secondary or tertiary recovery of oil. The slug of microemulsion which is injected into the subterranean formation is of a pore volume effective to displace the crude oil in the formation to and through one or more production wells. Generally based upon economic considerations, the slug is introduced as a 0.03 to 0.6, preferably a 0.05 to 0.2, pore volume slug. The thickened water which is injected through the injection means after the injection of the slug of microemulsion can be any conventional thickened water utilized as a driving fluid in microemulsion processes. In this regard, the water can be thickened with conventional thickening agents such as the various known viscosity increasing additives such as fatty acid soaps, alginates, sucrose, dextran, amines, glycerine, various anionic surfactants such as sulfated ethoxylated alcohols, and a number of water soluble polymers, including polysaccharides such as "Kelzan XC" sold by Kelco Corporation and high molecular weight polyacrylamides, more specifically partially hydrolyzed polyacrylamides such as "Pusher" sold by Dow Chemical Company. To avoid a "fingering" effect, it is preferred that the mobility of the thickened water be less than or equal to the mobility of the microemulsion slug. Following the injection of the thickened water, unthickened water is injected as a flooding medium, the thickened water and unthickened water being injected in amounts which vary widely with amounts up to 2 pore volumes or more being applicable.

The thickened water and unthickened water act as driving fluids to drive the microemulsion slug through the subterranean formation wherein the microemulsion slug displaces the crude oil trapped therein. The crude oil is driven to the production means and through the production means brought to the surface of the earth. Through this procedure it is possible to effectively recover crude oil through a secondary or tertiary microemulsion flooding operation.

It should be appreciated from the foregoing discussion that the microemulsions of this invention are not limited to microemulsion compositions falling above the binodal curve of the ternary diagram for said microemulsion systems. A microemulsion may be used where the microemulsion is immiscible and in equilibrium with the oil or water or both the oil and water used to form the microemulsion. In this case the microemulsion composition is essentially on the binodal curve. It should be understood that microemulsion compositions do not lie in the multiphase region of a ternary diagram. For compositions within this multiphase region, at least two immiscible phases will be formed and at least one of these phases will be a microemulsion having a composition falling essentially on the binodal curve.

The microemulsion and method of the present invention will now be illustrated by reference to the following examples, it being understood that these examples are presented for purposes of illustration only and the present invention is in no way to be deemed as limited thereby. In the examples all percentages except salinity are in volume percent.

EXAMPLE 1

This example is presented to illustrate the effectiveness of the single-phase microemulsion of the present invention in the reduction of residual oil content. A microemulsion was utilized having the following composition: 74.2% oil, i.e. a 90/10 Isopar M/Heavy Aromatic Naphtha composition, 16.7% aqueous medium, i.e. a 2% NaCl brine, and 9.1% of the surfactant, monoethanolamine $C_{12}$-orthoxylene sulfonate.

Figure 6:
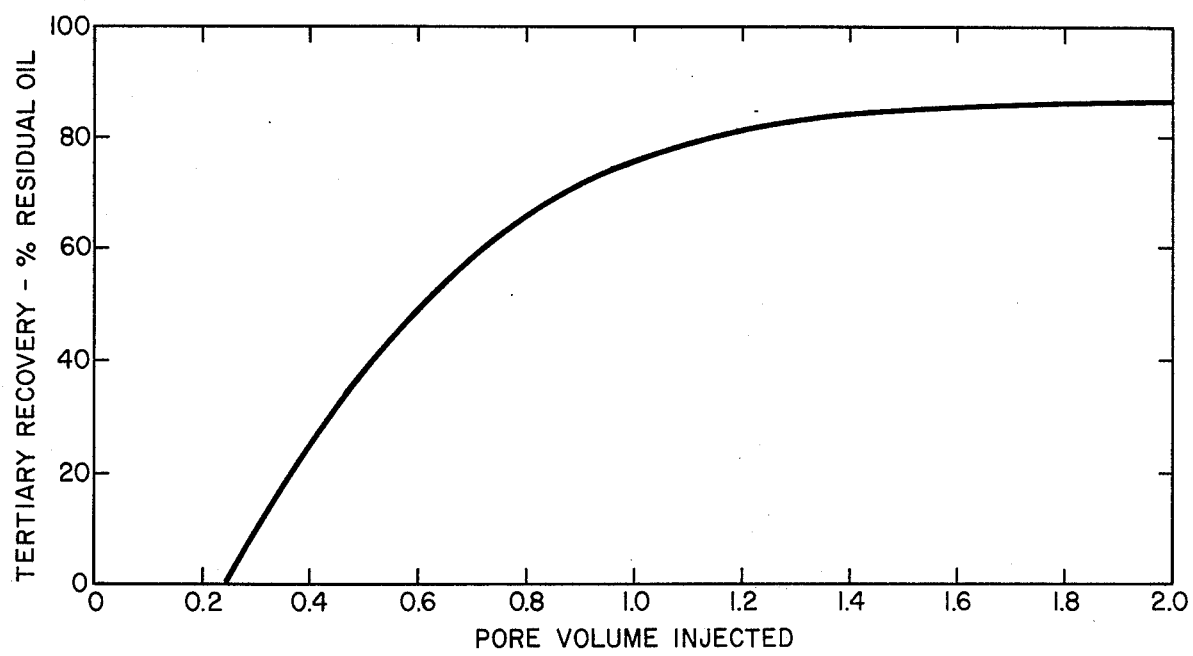
FIG. 6 is a plot illustrating oil recovery capability of a microemulsion system of the present invention.

The above microemulsion was utilized to recover residual Loudon crude, i.e. a crude oil from the Loudon field, Illinois, from a 4 foot × 1 × 1 inch Berea sandstone core having an absolute permeability to brine of 600 md. The resident water of the core contained 2% sodium chloride and a flood was conducted by injecting a 4.2% PV slug of the microemulsion at a frontal velocity of one foot per day. The slug was driven by continuous injection at one foot per day of 1600 ppm Kelzan XC in 2% NaCl water with the results of the flood in terms of the percentage of residual oil recovered being measured. The results are given in FIG. 6 which shows the oil recovery versus the total pore volume injection. It can be seen from the curve in FIG. 6 that oil recovery after 2.0 PV total injection was 86% of the residual oil. This, therefore, illustrates the effectiveness of the microemulsion in the microemulsion flooding process and in the recovery of crude oil.

EXAMPLE 2

This example illustrates the effectiveness of the single-phase microemulsion of the present invention containing a cosurfactant in the reduction of the final oil content in a core. The flood was run in a 4 foot × 1 × 1 inch Berea core having an absolute permeability to brine of 411 md and containing 32.7% residual saturation of 90/10 Isopar M/Heavy Aromatic Naphtha oil. The microemulsion utilized was one which contained 13% of the surfactant, monoethanolamine $C_{12}$-orthoxylene sulfonate; 7% co-surfactant, tertiary amyl alcohol; 65% oil, a 90/10 Isopar M/Heavy Aromatic Naphtha mixture; with the remainder being the aqueous medium. A 1.0 PV slug of the microemulsion was injected through the Berea core and the microemulsion slug was displaced by 750 ppm Kelzan XC in 1% NaCl water. The flood was run at a constant frontal velocity of 1 foot per day and all of the resident oil was recovered. A final oil saturation accounting for injected oil of 5.5% was achieved.

EXAMPLE 3

A further flood was carried out to illustrate the effectiveness of the microemulsion of the present invention containing cosurfactants for the tertiary recovery of crude oil. The composition employed was a single-phase microemulsion comprising 4.1% of a monoethanolamine $C_{12}$-orthoxylene sulfonate, 5.1% of a solubilizer, an ethoxylated alkyl phenol sulfate having a chain length of 18 carbon atoms and an average degree of ethoxylation of 13.2, 3% isopropyl alcohol, 37% of an oil, 90/10 Isopar M/Heavy Aromatic Naphtha mixture with the remainder being Tar Springs brine. A 10% PV bank of the above microemulsion was injected into a 4 foot × 1 × 1 inch Berea core containing residual Loudon crude oil at a frontal velocity of one foot per day with the 10% PV bank being driven at one foot per day by 8000 ppm Neodol 25-3S in Tar Springs brine. As a result of this flooding, it was determined that the Loudon crude oil saturation was reduced from a value of 35% to 4.5% accounting for oil injected in the microemulsion. Oil recovery amounted to 100% of the resident oil and more than one-half of the oil injected in the slug. This, therefore, establishes the effectiveness of the microemulsion of the present invention for the recovery of crude oil.

EXAMPLE 4

Similar microemulsion flooding processes were carried out utilizing the following microemulsions. Microemulsion A - 20% of a surfactant mixture in a ratio of 63/37 monoethanolamine $C_{12}$-orthoxylene sulfonate/-tertiary amyl alcohol; 65% of an oil, 90/10 Isopar M/Heavy Aromatic Naphtha; and 15% of 1% NaCl water. Microemulsion B - 15% of a surfactant mixture, 63/37 monoethanolamine $C_{12}$-orthoxylene sulfonate/-tertiary amyl alcohol; 61% of an oil, 90/10 Isopar M/Heavy Aromatic Naphtha; and 24% of 1% NaCl water. Microemulsion C - 12% of a surfactant mixture, 63/37 monoethanolamine $C_{12}$-orthoxylene sulfonate/-tertiary amyl alcohol; 59% of an oil, 90/10 Isopar M/Heavy Aromatic Naphtha; and 29% of 1% NaCl.

A series of microemulsion core floods was run to illustrate the effects of rate and injection composition on oil recovery, the floods being run in 4 foot $\times$ 1 $\times$ 1 inch Berea cores having approximate absolute permeability to brine of 300 md with the resident water being 1% NaCl and the residual oil phase being 90/10 Isopar M/Heavy Aromatic Naphtha. Five percent PV slugs of injection compositions A, B, and C were injected at varying rates ranging from 0.1 to 6.0 feet per day, with all three injection compositions having a viscosity of 12 cps at a shear rate of 11.5 sec.$^{-1}$ at approximately 22° C. The slugs were displaced by continuous injection of 1000 ppm Kelzan XC in 1% NaCl water, the polymer concentration being selected to yield adequate mobility control over the range of rates of 0.1 to 6.0 feet per day employed for the floods.

In all instances, the final core oil saturations were substantially reduced by the microemulsion flooding technique.

EXAMPLE 5

A further flood was conducted in a 4 foot $\times$ 1 $\times$ 1 inch Berea core having a residual oil of 90/10 Isopar M/Heavy Aromatic Naphtha and 2% NaCl water. The microemulsion utilized was as follows: 1% $C_{12}$-orthoxylene sulfonate (Na salt); 1% alkylate oil; 1% sodium tripolyphosphate; remainder 2% NaCl water. The flood was conducted at a frontal velocity of 1 foot per day and a final oil saturation of about 13% was achieved.

EXAMPLE 6

Figure 8:
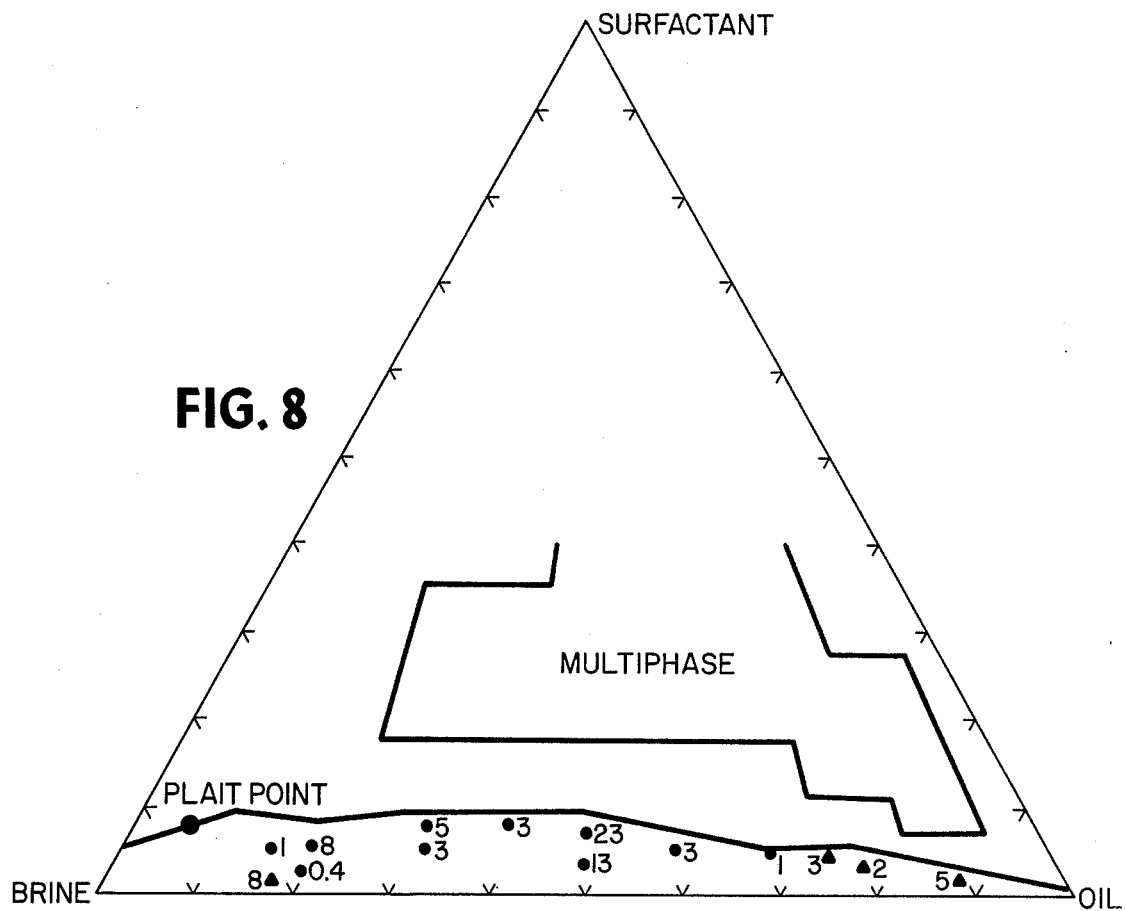
FIG. 8 is a ternary phase diagram of a specific microemulsion system illustrating the interfacial tension, expressed in millidyne/cm, between equilibrium phases formed from compositions within the multiphase region of the ternary diagram.

This example shows the microemulsion systems of the present invention exhibit low interfacial tensions between immiscible phases formed from oil-water-surfactant compositions falling within the multiphase region of the oil-water-surfactant ternary diagram. The microemulsion system was composed of an aqueous solution containing 2% sodium chloride, a mixture of 90/10 Isopar-M/HAN, and dodecyl orthoxylene sulfonate as the surfactant. All the interfacial tension measurements were made between immiscible phases formed from compositions within the multiphase region of the ternary diagram. FIG. 8 illustrates a ternary diagram for this microemulsion system. Compositions in the multiphase region are represented (FIG. 8) by triangular points (▲) and circular points (●). If there are more than two immiscible phases formed, the composition is designated by a circular point, and if there are only two immiscible phases formed the composition is designated by a triangular point. Interfacial tension between the principal microemulsion phase formed from these compositions and the brine which is immiscible and in equilibrium with the microemulsion are given in FIG. 8 in millidyne/cm. As can be seen from FIG. 8, interfacial tensions range from 0.0004 to 0.023 dyne/cm.

While the present invention has been described primarily with respect to the foregoing specific exemplification, it should be understood that the present invention is not in any way to be limited thereto, but rather must be construed as broadly as all or any equivalents thereof.

What we claim is:

1. In a secondary or tertiary method of recovering crude oil from a subterranean formation wherein a microemulsion is injected into the formation through at least one injection means to displace crude oil in the formation toward at least one production means, the improvement wherein said microemulsion comprises an oil, an aqueous medium, and in am amount sufficient to produce a single-phase microemulsion a surfactant comprising a $C_{8-16}$-orthoxylene sulfonate, said microemulsion exhibiting an interfacial tension of from 0.0 to 0.1 dyne/cm with the crude oil.

2. The method of claim 1 wherein said microemulsion is miscible with said crude oil.

3. The method of claim 1 wherein said microemulsion exhibits an interfacial tension of from 0.0 to 0.04 dyne/cm with the crude oil.

4. The method of claim 1 wherein said surfactant is a $C_{12}$-orthoxylene sulfonate.

5. The method of claim 1 wherein said surfactant is in the form of a monoethanolamine salt of a $C_{8-16}$-orthoxylene sulfonic acid.

6. The method of claim 1 wherein said aqueous medium is a brine with a salt concentration of up to 2½% by weight.

7. The method of claim 6 wherein said brine has physical and chemical properties which are substantially the same as those of the brine in the subterranean formation.

8. The method of claim 1 wherein said microemulsion further contains a cosurfactant.

9. The method of claim 8 wherein said cosurfactant is selected from alcohols, ethoxylated alcohols, sulfated ethoxylated alcohols, sufonated ethoxylated alcohols, ethoxylated phenols, sulfated ethoxylated phenols, sulfonated ethoxylated phenols and synthetic sulfonates.

10. The method of claim 8 wherein said cosurfactant is a $C_{1-7}$ orthoxylene sulfonate.

11. The method of claim 8 wherein said cosurfactant is present in an amount of from about 0.01 to about 20% based on the volume of the microemulsion.

12. The method of claim 1 wherein said surfactant is present in an amount of about 0.1 to about 15% based on the volume of the microemulsion.

13. The method of claim 1 wherein said oil has physical and chemical properties which are substantially the same as those of the crude oil in the subterranean formation.

14. The method of claim 1 wherein the injection of said microemulsion is preceded by primary depletion and waterflooding of said subterranean formation.

15. The method of claim 14 wherein said microemulsion is injected as a 0.03 to 0.6 PV slug.

16. The method of claim 15 wherein thickened water and then unthickened water are injected into said subterranean formation subsequent to said slug of microemulsion to drive said slug of microemulsion through said formation.

17. A method of recovering residual oil from a subterranean formation which has been subjected to primary depletion and waterflooding which comprises:
   a. injecting into the flooded-out formation through at least one injection means in fluid communication with at least one production means a slug of a single-phase microemulsion comprising an oil, an aqueous medium and, in an amount sufficient to produce said single-phase microemulsion, a surfactant comprising a $C_{8-16}$-orthoxylene sulfonate, said microemulsion exhibiting an interfacial tension of from 0.0 to 0.1 dynes/cm with the crude oil, said microemulsion being capable of displacing residual crude oil in said formation toward said production means;
   b. thereafter injecting thickened water to drive said slug of microemulsion through said formation toward said production means;
   c. injecting unthickened water subsequent to the injection of said thickened water; and
   d. recovering residual crude oil through said production means.

18. The method of claim 17 wherein said microemulsion is miscible with said crude oil.

19. The method of claim 17 wherein said microemulsion exhibits an interfacial tension of from 0.0 to 0.04 dynes/cm with the crude oil.

20. The method of claim 17 wherein said surfactant is a $C_{12}$-orthoxylene sulfonate.

21. The method of claim 17 wherein said surfactant is in the form of a monoethanolamine salt of a $C_{8-16}$-orthoxylene sulfonic acid.

22. The method of claim 17 wherein said aqueous medium is a brine with a salt concentration of up to 2½% by weight.

23. The method of claim 17 wherein said microemulsion further contains a cosurfactant.

24. The method of claim 23 wherein said cosurfactant is selected from alcohols, ethoxylated alcohols, sulfated ethoxylated alcohols, sulfonated ethoxylated alcohols, ethoxylated phenols, sulfated ethoxylated phenols, sulfonated ethoxylated phenols and synthetic sulfonates.

25. The method of claim 23 wherein said cosurfactant is a $C_{1-7}$ orthoxylene sulfonate.

26. The method of claim 23 wherein said cosurfactant is present in an amount of from about 0.01 to about 20% based on the volume of the microemulsion.

27. The method of claim 17 wherein said surfactant is present in an amount of about 0.1 to about 15% based on the volume of the microemulsion.

28. The method of claim 17 wherein said microemulsion is injected as a 0.03 to 0.6 PV slug.

29. In a secondary or tertiary method of recovering crude oil from a subterranean formation wherein a microemulsion is injected into the formation through at least one injection means to displace crude oil in the formation toward at least one production means, the improvement wherein said microemulsion comprises an oil, an aqueous medium, in an amount sufficient to produce a single-phase microemulsion a surfactant comprising a $C_{8-16}$-orthoxylene sulfonate, and a co-surfactant comprising a sulfonated ethoxylated phenol, said microemulsion exhibiting an interfacial tension of from 0.0 to 0.1 dyne/cm with the crude oil.

30. A method of recovering residual oil from a subterranean formation which has been subjected to primary depletion and waterflooding which comprises:
   a. injecting into the flooded-out formation through at least one injection means in fluid communication with at least one production means a slug of a single-phase microemulsion comprising
      i. an oil,
      ii. an aqueous medium,
      iii. in an amount sufficient to produce said single-phase microemulsion, a surfactant comprising a $C_{8-16}$-orthoxylene sulfonate, and
      iv. a co-surfactant comprising a sulfonated ethoxylated phenol, said microemulsion exhibiting an interfacial tension of from 0.0 to 0.1 dynes/cm with the crude oil, said microemulsion being capable of displacing residual crude oil in said formation toward said production means;
   b. thereafter injecting thickened water to drive said slug of microemulsion through said formation toward said production means;
   c. injecting unthickened water subsequent to the injection of said thickened water; and
   d. recovering residual crude oil through said production means.

* * * * *